No. 889,092. PATENTED MAY 26, 1908.
J. C. BARNES.
ROTARY ENGINE.
APPLICATION FILED SEPT. 19, 1906.

2 SHEETS—SHEET 1.

WITNESSES:
Jas. C. Wobusmith
Ella M. Ware

INVENTOR
John Carlton Barnes
BY
A. V. Group
ATTORNEY.

No. 889,092. PATENTED MAY 26, 1908.
J. C. BARNES.
ROTARY ENGINE.
APPLICATION FILED SEPT. 19, 1906.
2 SHEETS—SHEET 2.
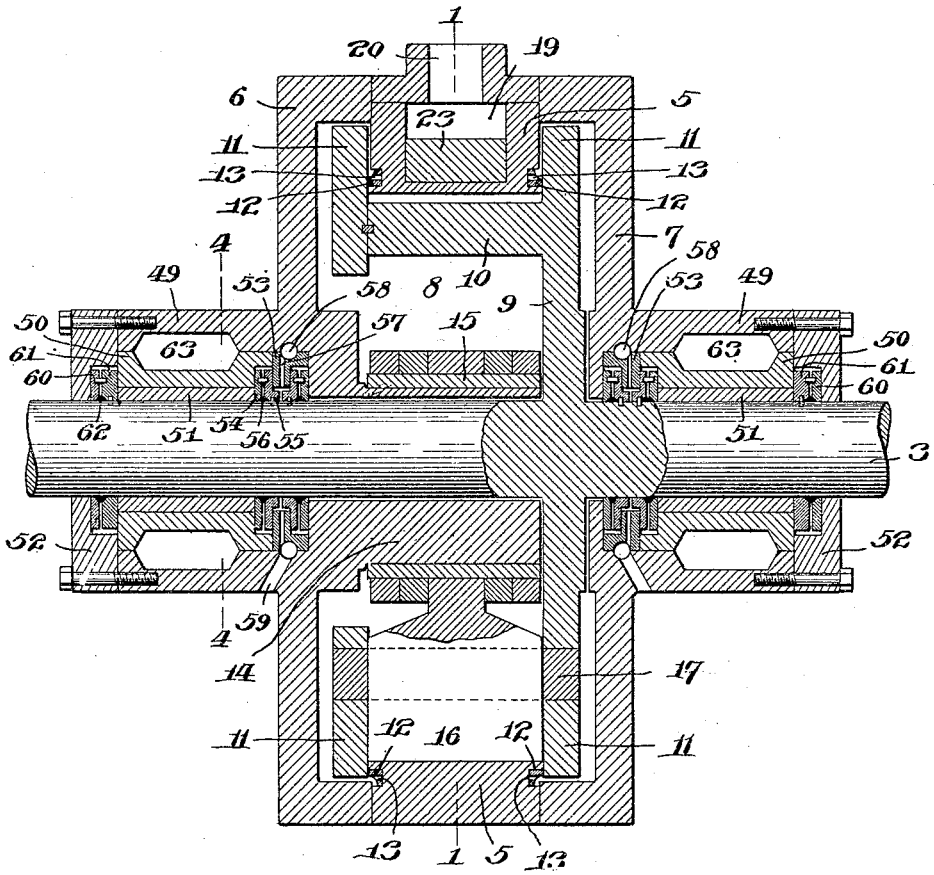
WITNESSES:
Jas. C. Wobensmith
Ella M. Ware
INVENTOR
John Carlton Barnes
BY
A. V. Groupy
ATTORNEY.

UNITED STATES PATENT OFFICE.

JOHN CARLTON BARNES, OF PHILADELPHIA, PENNSYLVANIA, ASSIGNOR OF FIFTY-ONE ONE-HUNDREDTHS TO BENJAMINE F. LARE, OF PHILADELPHIA, PENNSYLVANIA.

ROTARY ENGINE.

No. 889,092.      Specification of Letters Patent.      Patented May 26, 1908.

Application filed September 19, 1906. Serial No. 335,192.

*To all whom it may concern:*

Be it known that I, JOHN CARLTON BARNES, a citizen of the United States, residing at Philadelphia, in the county of Philadelphia and State of Pennsylvania, have invented certain new and useful Improvements in Rotary Engines, of which the following is a specification.

The object of my invention is to provide a simple, inexpensive and efficient rotary engine; and to this end the invention consists in the novel construction and combinations of parts which will be hereinafter fully described and claimed.

Figure 1:
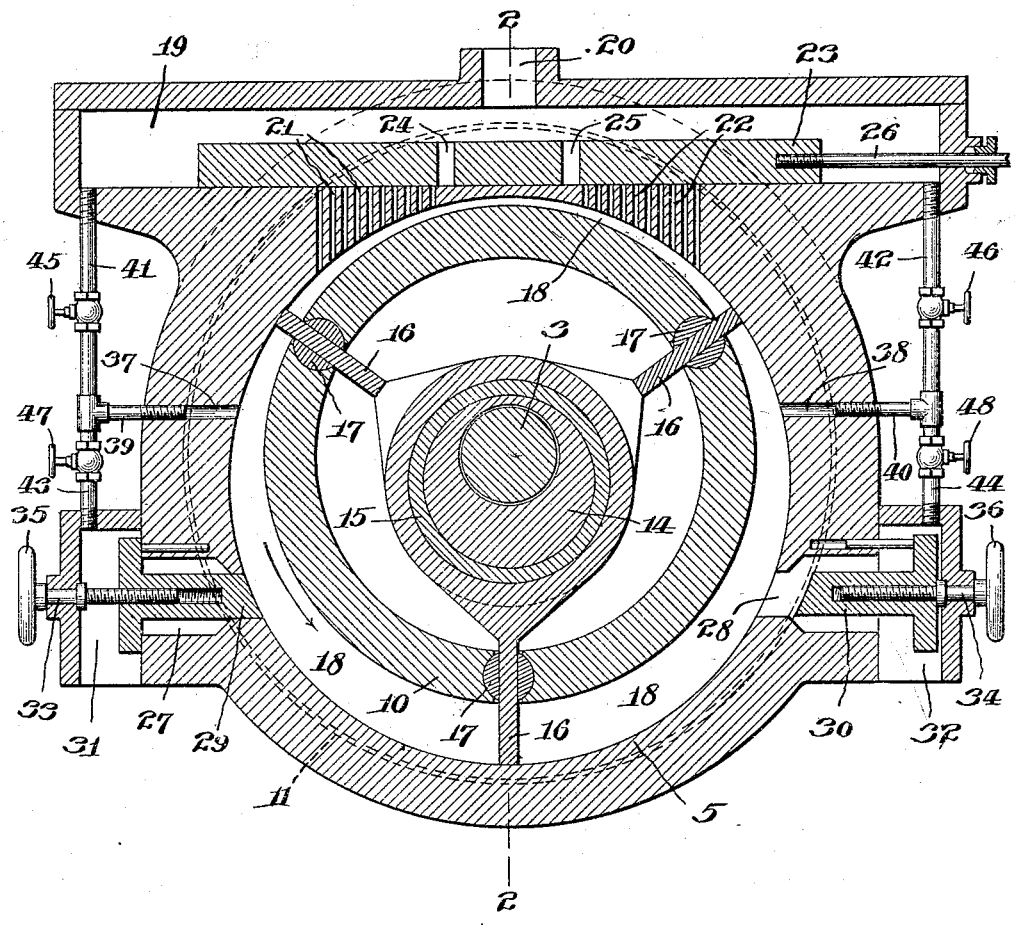
Figure 4:
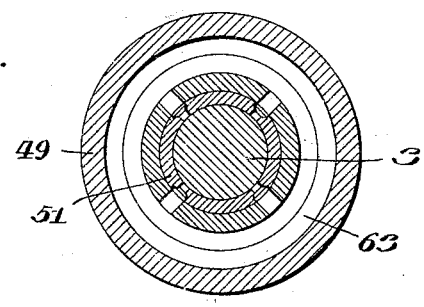

In the drawings:—Figure 1 is a vertical section through an engine embodying my invention, taken at right angles to the main shaft, as on the line 1—1, of Fig. 2. Fig. 2 is a vertical sectional view, as on the line 2—2, of Fig. 1. Fig. 3 is a view of the radial wings, detached and on a reduced scale. Fig. 4 is a sectional detail as on the line 4—4, of Fig. 2.

3 designates the main shaft and 5 the cylinder arranged eccentrically to the shaft 5. The cylinder 5 is held in place by the side members 6 and 7 of the main frame, and the side members 6 and 7 and cylinder 5 inclose a chamber 8 into which the cylinder 5 extends.

Formed on or secured to the shaft 3 is a flange 9 which carries a piston ring 10 within the cylinder 5 and arranged concentrically to the shaft and eccentrically to the piston. Projecting outwardly from the sides of the ring 10 are flanges 11 which extend over the edges of the cylinder 5 and inclose the space between the cylinder and piston ring. The side walls of the cylinder 5 have formed therein grooves for the reception of packing rings, 12, and the rings 12 are provided with openings 13 to permit the escape of steam from the base of the grooves and thus prevent any steam that may escape from within the cylinder to the base of the grooves from forcing the rings 12 against the flanges 11 with the consequent wear.

Projecting into the chamber 8 from the side member 6 is a hub or bearing 14 on which is mounted a sleeve 15. The hub 14 is arranged concentrically to the cylinder 5. On the sleeve, 15, are mounted the inner ends of radially arranged wings 16. In the present instance three wings are employed and the inner ends of two of the wings are bifurcated to embrace the inner end of the other wing surrounding the sleeve 15. The wings 16 extend radially through and are slidingly fitted to openings in round bearing blocks 17, which extend through and are fitted to round openings in the piston ring 10 so as to be partially rotatable therein. The lateral edges of the wings 16 extend into engagement with the inner faces of the flanges 11 and the outer edges of the wings extend to the inner wall of the cylinder 5 thus dividing the space between the piston ring 10 and the cylinder 5 into separate compartments 18.

From the foregoing description it will be seen that during the rotation of the shaft 3 and therewith the ring 10 the wings 16 will slide through the blocks 17 and that the compartments 18 will expand and contract in prescribed order.

Formed in the upper portion of the cylinder casting is a steam chest 19 having a steam inlet opening 20, and the cylinder 5 is provided with a series of openings 21 on one side, and a series of openings 22 the other side of the vertical center of the piston ring 10, which openings afford communication between the steam chest 19 and the compartments 18 in prescribed order during the rotation of the shaft 3. These openings 21 and 22 are covered by a slide valve 23 having two openings 24 and 25 therein. By moving the valve 23 to bring either the opening 24 or 25 into register with either the opening 21 or 22 respectively, steam may be admitted to the compartments 18. The valve 23 may be operated by a rod 26 which extends outwardly through a stuffing box in the wall of the steam chest.

The lower portion of the cylinder 5 on each side of the vertical center of the piston ring 10 is provided with exhaust ports 27 and 28 which may be closed by valves 29 and 30 which extend into chambers 31 and 32 opening into the atmosphere. Rotatably fitted to the walls of the chambers 31 and 32 are stems 33 and 34, the inner ends of which are screw-threaded and screwed into the valves 29 and 30. The outer ends of the stems are provided with hand wheels 35 and 36, whereby the stems 33 and 34 may be turned to move the valves 29 and 30 in and out, and thus open and close the exhaust ports 27 and 28.

Opening into the cylinder 5 above the exhaust ports 27 and 28 are ports 37 and 38, and leading from the ports 27 and 28 are pipes 39 and 40. The pipes 39 and 40 communicate with the steam chest 19 by pipes 41 and 42, and the pipes 39 and 40 communicate with the chambers 31 and 32 by pipes 43 and 44, respectively; the pipes 41, 42, 43, and 44 being provided with valves 45, 46, 47, and 48 respectively for a purpose hereinafter explained.

The bearings for the main shaft 3 comprise hollow bosses 49 which project from the side members 6 and 7, collars 50 arranged within the bosses 49, sleeves 51 interposed between the collars 50 and shaft 3 and end heads 52 held against the ends of the bosses 49 by suitable screws. Between the base of the opening in each boss 49 and the adjacent sleeve 51, is a pair of stuffing boxes separated by a fixed ring 53 which is held in place by frictional engagement with the collar 50. Each stuffing box comprises a pair of rings 54 and 55 surrounding the shaft 3, and a packing ring, 56, surrounding the shaft 3 and held between the rings 54 and 55 and in engagement with the shaft 3. The rings 54 and 55 are held together by suitable pins and the rings 55 are pinned to the shaft 3 to cause the stuffing boxes to rotate with the shaft and thus obviate any liability of wear upon the rings 56. The purpose of these stuffing boxes is to prevent the escape of steam from the chamber 8 into the bearings for the main shaft 3. Should any steam pass the stuffing box next adjacent to the chamber 8, the escaping steam will pass out through openings 57 in the ring 53 to circular openings 58 and thence out to the atmosphere through openings 59.

To prevent the escape of oil from the outer ends of the bearings for the shaft 3, I provide stuffing boxes arranged within grooves on the heads 52. Each stuffing box comprises a pair of rings 60 and 61 and an interposed packing ring 62 surrounding the shaft 3. The rings 60 and 61 are held together by a pin and the rings 61 are pinned to the shaft 3 to cause the stuffing boxes to rotate therewith to prevent wear upon the packing ring 62. Formed between the collars 50 and bosses 49 are oil chambers 63, and the collars 50 and sleeves 51 are provided with suitable openings therein to permit oil to pass from the chambers 63 to the shaft 3 to lubricate the bearings.

The operation may be briefly described as follows:—To run the engine in the direction indicated by the arrow in Fig. 1, the valve 30 is operated to open the exhaust port 28, the valve 23 is moved to bring the opening 24 into register with the openings 21 and the valve 45 is opened to admit steam to the compartment 18 in advance of the openings 21. The steam in this compartment acting against the wing 16 exposing the greater area forces the piston ring 10 and shaft 3 in the direction indicated by the arrow. After the engine has started the valve 45 may be closed and the steam is admitted to the compartment 18 in prescribed order through the openings 21, the compartments 18 receiving steam as they pass the openings 21 and the steam expanding and forcing the piston ring around until the steam is exhausted through the port 28. By moving the valve 23, the opening 24 may be moved over the series of openings 21 and the timing of the admission of steam to the compartments 18 with respect to the position of the wings may be regulated. When it is desired to run the engine in the reverse direction, steam is admitted to the compartments 18 through the openings 22, and exhausted therefrom through the port 27.

I claim:—

1. In a rotary engine, the combination of casing, a shaft extending therethrough, a cylinder extending into the casing eccentric to the shaft, a piston ring carried by the shaft within the cylinder and concentric to the shaft, side flanges carried by the ring and extending over the edges of the cylinder, perforated packing rings between the flanges and cylinder, a bearing concentric to the cylinder, wings rotatably mounted on the bearing and extending through the ring and dividing the space between the ring and cylinder into compartments, means for introducing steam to said compartments at one point, and means for exhausting steam from said compartments at another point.

2. In a rotary engine, the combination of a casing, a shaft extending therethrough, a pair of stuffing boxes between the casing and shaft on each side of the piston ring, said casing having an outlet for the steam between each pair of stuffing boxes; a cylinder extending into the casing eccentric to the shaft; a piston ring carried by the shaft within the cylinder and concentric to the shaft; means for dividing the space between the ring and cylinder into expansible and contractible compartments, means for introducing steam to said compartments at one point and means for exhausting steam from said compartments at another point.

In testimony whereof I affix my signature in presence of two witnesses.

JOHN CARLTON BARNES.

Witnesses:
A. V. GROUPE,
ELLA M. WARE.